(12) United States Patent
Schirck

(10) Patent No.: US 10,707,956 B1
(45) Date of Patent: Jul. 7, 2020

(54) ACTIVE FIBER TAP

(71) Applicant: Profitap HQ B.V., Eindhoven (NL)

(72) Inventor: Laurent Schirck, Trooz (BE)

(73) Assignee: Profitap HQ B.V., Eindhoven (NL)

(*) Notice: Subject to any disclaimer, the term of this patent is extended or adjusted under 35 U.S.C. 154(b) by 0 days.

(21) Appl. No.: 16/514,536

(22) Filed: Jul. 17, 2019

(30) Foreign Application Priority Data

Jul. 12, 2019 (EP) .................................... 19186023

(51) Int. Cl.
*H04B 10/03* (2013.01)
*H04B 10/07* (2013.01)
*H04B 10/25* (2013.01)

(52) U.S. Cl.
CPC .......... *H04B 10/03* (2013.01); *H04B 10/2504* (2013.01)

(58) Field of Classification Search
CPC .............................. H04B 10/03; H04B 10/07
See application file for complete search history.

(56) References Cited

U.S. PATENT DOCUMENTS

| 4,913,509 A | 4/1990 | Baker |
| 6,424,627 B1* | 7/2002 | Sørhaug .................. H04L 43/00 370/241 |
| 7,542,681 B2 | 6/2009 | Cornell et al. |
| 2006/0233115 A1* | 10/2006 | Matityahu ........... H04L 43/0882 370/252 |
| 2007/0171966 A1 | 7/2007 | Light |
| 2007/0253349 A1 | 11/2007 | Light |
| 2008/0013467 A1 | 1/2008 | Light |
| 2008/0014879 A1 | 1/2008 | Light |
| 2010/0177644 A1* | 7/2010 | Kucharczyk ........ H04L 41/0681 370/250 |
| 2018/0034542 A1 | 2/2018 | Fung |

FOREIGN PATENT DOCUMENTS

EP 3454507 A1 3/2019

OTHER PUBLICATIONS

European Search Report and Written Opinion for European patent application No. 19186023.8, dated Jan. 29, 2020.

* cited by examiner

*Primary Examiner* — Shi K Li
(74) *Attorney, Agent, or Firm* — Steven M. Koehler; Westman, Champlin & Koehler, P.A.

(57) ABSTRACT

A network tap comprises a set of optical signal regeneration circuits and a failover circuit. The set of optical signal regeneration circuits is configured to convert an input optical signal from one network device to an electromagnetic signal and generate output optical signals for another network device and for a monitoring device from the electromagnetic signal. The failover circuit is configured to provide the input optical signal to the set of optical signal generation circuits in a normal mode and provide the input optical signal to the other network device in a failure mode.

18 Claims, 7 Drawing Sheets

US 10,707,956 B1

ACTIVE FIBER TAP

FIELD OF THE INVENTION

The invention relates to a network tap, a fiber network tap in particular.

BACKGROUND OF THE INVENTION

A network tap is a hardware device with takes a copy the network traffic/frames and provides them to a monitoring device. A network tap has at least three ports: a first network port for connecting a first network device, a second network port for connecting a second network device and a third network port for connecting a monitoring device. The tap is inserted between the first network device and the second network device and allows all traffic to pass through it unimpeded in real-time, but further copies this traffic to the third network port, enabling the monitoring device to monitor this traffic. A network tap should have the lowest impact on the monitored network devices. The network tap should not cause connection outage or cause performance (e.g. bit error rate) degradation. Network taps are commonly used for networking intrusion detection and network probes, amongst others.

Network taps exist for both electromagnetic signals, e.g. transported by twisted pair cables, and fiber optic signals. U.S. Pat. No. 7,542,681 B2, for example, describes such a fiber optic network tap. This tap includes a first port for connecting to a pluggable optoelectronic module such as an optical transceiver, a link port for connecting to an optical link configured to receive and send data to the optical transceiver, and a tap port for relaying diverted optical data to a storage and/or analyzing device. Couplers are used to split the optical signals entering the tap from the first port and/or the link port such that a usable portion of the optical signal(s) can be stored and/or analyzed.

For decades, fiber light splitting has been the preferred method for fiber line data monitoring. With this passive tapping method, i.e. a method not requiring a powered circuit, a part of the light is taken from the fiber optic communication line for monitoring purposes. The splitter adds an attenuation (in dB) on the line, deducting from the optical budget (which can be expressed as the difference in dB between transmitter power and the receiver sensitivity).

Very often, a light splitting ratio is selected, in order to have the least impact on the tapped communication line, and a minimal amount of light is taken to be able to monitor it. Because the Bit Error Rate characteristic is related to the light level at the receiver. One of the cheapest and most reliable components offering light splitting with a factory selectable split ratio is the FBT (Fused Biconical Tapered) splitter.

With the increase of communication speeds (10G, 40G, 100G, 400G), fiber optic communications are more sensitive to noise, have tighter optical budget. Because of the line distances, the optical budget is sometimes too weak to be able to monitor the line with traditional methods, introducing an extra attenuation to the line would disturb the communication line, making it unstable or degrading the performances.

SUMMARY OF THE INVENTION

In a first aspect of the invention, a network tap comprises a first set of one or more connectors for connecting to a first network device, a second set of one or more connectors for connecting to a second network device, a third set of one or more connectors for connecting to a monitoring device, a set of one or more optical signal regeneration circuits, and a failover circuit configured to receive a first optical input signal from said first set of connectors and provide said first optical input signal to said set of optical signal regeneration circuits in a normal mode and to said second set of connectors in a failure mode and further configured to receive a second optical input signal from said second set of connectors and provide said second optical input signal to said set of one or more optical signal regeneration circuits in said normal mode and to said first set of connectors in said failure mode.

Said set of one or more optical signal regeneration circuits is configured to receive said first optical input signal from said failover circuit, convert said first optical input signal to a first set of one or more electromagnetic signals, generate a first optical output signal and a second optical output signal from said first set of one or more electromagnetic signals and provide said first optical output signal to said second set of connectors and said second optical output signal to said third set of connectors.

Said set of one or more optical signal regeneration circuits is further configured to receive said second optical input signal from said failover circuit, convert said second optical input signal to a second set of one or more electromagnetic signals, generate a third optical output signal and a fourth optical output signal from said second set of one or more electromagnetic signals and provide said third optical output signal to said first set of connectors and said fourth optical output signal to said third set of connectors.

In other words, this fiber tap is composed of a set of active circuits for light level regeneration and signal replication, a failover circuit to limit the network interruption in case of a power outage, a set of input/output ports to connect to the monitored line and one or more output monitoring ports. This fiber tap presents a low attenuation characteristic with a minimal impact on the monitored line, both in normal mode and in failure mode. Furthermore, adding a light splitter on the line might increase the modal or chromatic dispersion, leading to the same negative effect at a certain rate or technology (25G, PAM-4, WDM). This may be avoided by not adding a light splitter.

Said first set of one or more connectors may comprise a first connector and a second connector, said second set of one or more connectors may comprise a third connector and a fourth connector and said third set of one or more connectors may comprise a fifth connector and a sixth connector. Use of different optical fibers for input and output signals is currently more common than combining input and output signals on a single fiber.

Said failover circuit may be configured to receive said first optical input signal from said second connector and provide said first optical input signal to said set of optical signal regeneration circuits in said normal mode and to said third connector in said failure mode and further configured to receive said second optical input signal from said fourth connector and provide said second optical input signal to said set of one or more optical signal regeneration circuits in said normal mode and to said first connector in said failure mode.

Said set of one or more optical signal regeneration circuits may then be configured to provide said first optical output signal to said third connector and said second optical output signal to said sixth connector and provide said third optical output signal to said first connector and said fourth optical output signal to said fifth connector.

Said set of one or more optical signal regeneration circuits may comprise a first optical signal regeneration circuit, a second optical signal regeneration circuit, a third optical signal regeneration circuit, and a fourth optical signal regeneration circuit. Said third optical signal regeneration circuit may be configured to receive said first optical input signal from said failover circuit and convert said first optical input signal to a first electromagnetic signal, said first electromagnetic signal being provided to said second optical signal regeneration circuit and said fourth optical signal regeneration circuit.

Said fourth optical signal regeneration circuit may be configured to receive said second optical input signal from said failover circuit and convert said second optical input signal to a second electromagnetic signal, said second electromagnetic signal being provided to said first optical signal regeneration circuit and said third optical signal regeneration circuit.

Said first optical signal regeneration circuit may be configured to receive said second electromagnetic signal from said fourth optical signal regeneration circuit, generate said fourth optical output signal from said second electromagnetic signal, and provide said fourth optical output signal to said fifth connector.

Said second optical signal regeneration circuit may be configured to receive said first electromagnetic signal from said third optical signal regeneration circuit, generate said second optical output signal from said first electromagnetic signal, and provide said second optical output signal to said sixth connector.

Said third optical signal regeneration circuit may further be configured to receive said second electromagnetic signal from said fourth optical signal regeneration circuit, generate said third optical output signal from said second electromagnetic signal, and provide said third optical output signal to said first connector via said failover circuit.

Said fourth optical signal regeneration circuit may further be configured to receive said first electromagnetic signal from said third optical signal regeneration circuit, generate said first optical output signal from said first electromagnetic signal, and provide said first optical output signal to said to said third connector via said failover circuit.

This makes it possible to use optical signal regeneration circuits that are (only) able to generate a single optical signal, which can be used in more situations and may therefore be cheaper to manufacture.

Alternatively, said set of one or more optical signal regeneration circuits comprises (only) a first optical signal regeneration circuit and a second optical signal regeneration circuit, wherein said first optical signal regeneration circuit is configured to receive said first optical input signal from said failover circuit, convert said first optical input signal to a first set of one or more electromagnetic signals, generate a first optical output signal and a second optical output signal from said first set of one or more electromagnetic signals and provide said first optical output signal to said third connector via said failover circuit and said second optical output signal to said sixth connector.

Said second optical signal regeneration circuit is then configured to receive said second optical input signal from said failover circuit, convert said second optical input signal to a second set of one or more electromagnetic signals, generate a third optical output signal and a fourth optical output signal from said second set of one or more electromagnetic signals and provide said third optical output signal to said first connector via said failover circuit and said fourth optical output signal to said fifth connector.

Said third set of one or more connectors may comprise a first pair of connectors and a second pair of connectors, said first pair of connectors comprising said fifth connector and a seventh connector and said second pair of connectors comprising said sixth connector and an eighth connector. This makes it easier to use standard cables that pair different optical fibers for input and output signals.

Said first set of one or more connectors may comprises a first bidirectional connector and said second set of one or more connectors comprises a second bidirectional connector. This is beneficial when it is desired or necessary to use BiDi (Bi-directional) transceivers. BiDi transceivers send and receive different wavelengths, compound them to one optical fiber without interference by using WDM technology.

Said network tap may further comprise a controller configured to detect whether power is being supplied to said network tap and control said failover circuit to activate said failure mode upon detecting that power is no longer being supplied to said network tap. Alternatively, a controller may be configured to check whether the optical signal regeneration circuits receive optical input signals, but do not generate optical output signals, and active the failure mode if they do not, for example.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
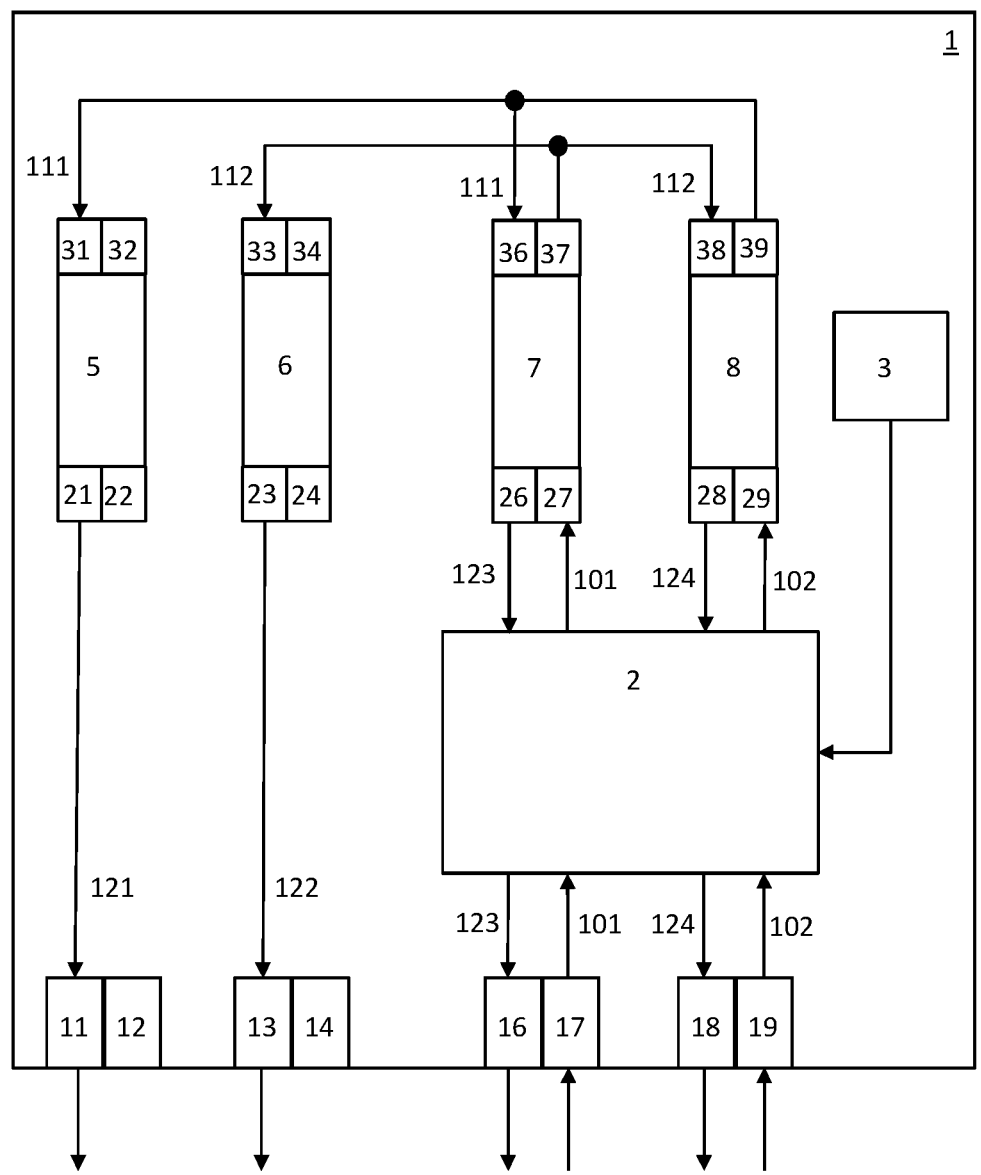
FIG. 1 is a block diagram of a first embodiment of the network tap.

FIG. 1 shows a first embodiment of the network tap. The network tap 1 comprises a first set of one or more connectors 16 and 17 for connecting to a first network device, a second set of one or more connectors 18 and 19 for connecting to a second network device, a third set of one or more connectors 11 and 13 for connecting to a monitoring device, a set of one or more optical signal regeneration circuits 5-8 and a failover circuit 2.

The failover circuit 2 is configured to receive a first optical input signal 101 from the first set of connectors 16 and 17 and provide the first optical input signal 101 to the set of optical signal regeneration circuits 5-8 in a normal mode and to the second set of connectors 18 and 19 in a failure mode and further configured to receive a second optical input signal 102 from the second set of connectors 18 and 19 and provide the second optical input signal 102 to the set of one or more optical signal regeneration circuits 5-8 in the normal mode and to the first set of connectors 16 and 17 in the failure mode.

The set of one or more optical signal regeneration circuits 5-8 is configured to receive the first optical input signal 101 from the failover circuit 2, convert the first optical input signal 101 to a first set of one or more electromagnetic signals 112, generate a first optical output signal 124 and a second optical output signal 122 from the first set of one or more electromagnetic signals 112 and provide the first optical output signal 124 to the second set of connectors 18 and 19 and the second optical output signal 122 to the third set of connectors 11 and 13.

The set of one or more optical signal regeneration circuits 5-8 is further configured to receive the second optical input signal 102 from the failover circuit 2, convert the second optical input signal 102 to a second set of one or more electromagnetic signals 111, generate a third optical output signal 123 and a fourth optical output signal 121 from the second set of one or more electromagnetic signals 111 and provide the third optical output signal 123 to the first set of connectors 16 and 17 and the fourth optical output signal 121 to the third set of connectors 11 and 13.

The optical signal regeneration circuits 5-8 are composed of optic modules (e.g. GBIC, SFP+, QSFP) ensuring the optical to electrical and electrical to optical conversion, regenerating the optical signal level. Additionally, depending on the type of signal regeneration required, a reclocking circuit (CDR, PHY) may be used to reshape the electrical signal.

The failover circuit 2 is an optical bypass switch with two states (failure mode/unpowered, normal mode/powered): For a fiber line consisting of one pair of fiber (one fiber per duplex) a dual 2×2 optical bypass switch may be used.

In the embodiment of FIG. 1, the first set of one or more connectors comprises a first connector 16 and a second connector 17, the second set of one or more connectors comprises a third connector 18 and a fourth connector 19 and the third set of one or more connectors comprises a fifth connector 11 and a sixth connector 13.

In the embodiment of FIG. 1, the failover circuit 2 is configured to receive the first optical input signal 101 from the second connector 17 and provide the first optical input signal 101 to the set of optical signal regeneration circuits 5-8 in the normal mode and to the third connector 18 in the failure mode and further configured to receive the second optical input signal 102 from the fourth connector 19 and provide the second optical input signal 102 to the set of one or more optical signal regeneration circuits 5-8 in the normal mode and to the first connector 16 in the failure mode, The set of one or more optical signal regeneration circuits 5-8 is then configured to provide the first optical output signal 124 to the third connector 18 and the second optical output signal 122 to the sixth connector 13 and provide the third optical output signal 123 to the first connector 16 and the fourth optical output signal 121 to the fifth connector 11.

In the embodiment of FIG. 1, the set of one or more optical signal regeneration circuits comprises a first optical signal regeneration circuit 5, a second optical signal regeneration circuit 6, a third optical signal regeneration circuit 7, and a fourth optical signal regeneration circuit 8.

The first optical signal regeneration circuit 5 has an optical output port 21 for transmitting an optical signal, an optical input port 22 for receiving an optical signal, an electromagnetic input port 31 for receiving an electromagnetic signal and an electromagnetic output port 32 for transmitting an electromagnetic signal. The second optical signal regeneration circuit 6 has an optical output port 23 for transmitting an optical signal, an optical input port 24 for receiving an optical signal, an electromagnetic input port 33 for receiving an electromagnetic signal and an electromagnetic output port 34 for transmitting an electromagnetic signal.

The third optical signal regeneration circuit 7 has an optical output port 26 for transmitting an optical signal, an optical input port 27 for receiving an optical signal, an electromagnetic input port 36 for receiving an electromagnetic signal and an electromagnetic output port 37 for transmitting an electromagnetic signal. The fourth optical signal regeneration circuit 8 has an optical output port 28 for transmitting an optical signal, an optical input port 29 for receiving an optical signal, an electromagnetic input port 38 for receiving an electromagnetic signal and an electromagnetic output port 39 for transmitting an electromagnetic signal.

The third optical signal regeneration circuit 7 is configured to receive the first optical input signal 101 from the failover circuit 2 and convert the first optical input signal 101 to a first electromagnetic signal 112. The first electromagnetic signal 112 is provided to the second optical signal regeneration circuit 6 and the fourth optical signal regeneration circuit 8.

The fourth optical signal regeneration circuit 8 is configured to receive the second optical input signal 102 from the failover circuit 2 and convert the second optical input signal 102 to a second electromagnetic signal 111. The second electromagnetic signal 111 is provided to the first optical signal regeneration circuit 5 and the third optical signal regeneration circuit 7.

The first optical signal regeneration circuit 5 is configured to receive the second electromagnetic signal 111 from the fourth optical signal regeneration circuit 8, generate the fourth optical output signal 121 from the second electromagnetic signal 111, and provide the fourth optical output signal 121 to the fifth connector 11.

The second optical signal regeneration circuit 6 is configured to receive the first electromagnetic signal 112 from the third optical signal regeneration circuit 7, generate the second optical output signal 122 from the first electromagnetic signal 112, and provide the second optical output signal 122 to the sixth connector 13.

The third optical signal regeneration circuit 7 is further configured to receive the second electromagnetic signal 111 from the fourth optical signal regeneration circuit 8, generate the third optical output signal 123 from the second electromagnetic signal 111, and provide the third optical output signal 123 to the first connector 16 via the failover circuit 2.

The fourth optical signal regeneration circuit 8 is further configured to receive the first electromagnetic signal 112 from the third optical signal regeneration circuit 7, generate the first optical output signal 124 from the first electromagnetic signal 112, and provide the first optical output signal 124 to the to the third connector 18 via the failover circuit 2.

In the embodiment of FIG. 1, the network tap further comprises a controller 3. The controller 3 is configured to detect whether power is being supplied to the network tap 1 and control the failover circuit 2 to activate the failure mode upon detecting that power is no longer being supplied to the network tap 1.

In the embodiment of FIG. 1, the third set of one or more connectors comprises a first pair of connectors and a second pair of connectors. The first pair of connectors comprises the fifth connector 11 and a seventh connector 12 and the second pair of connectors comprising the sixth connector 13 and an eighth connector 14. This makes it easier to use standard cables that pair different optical fibers for input and output signals.

Figure 2:
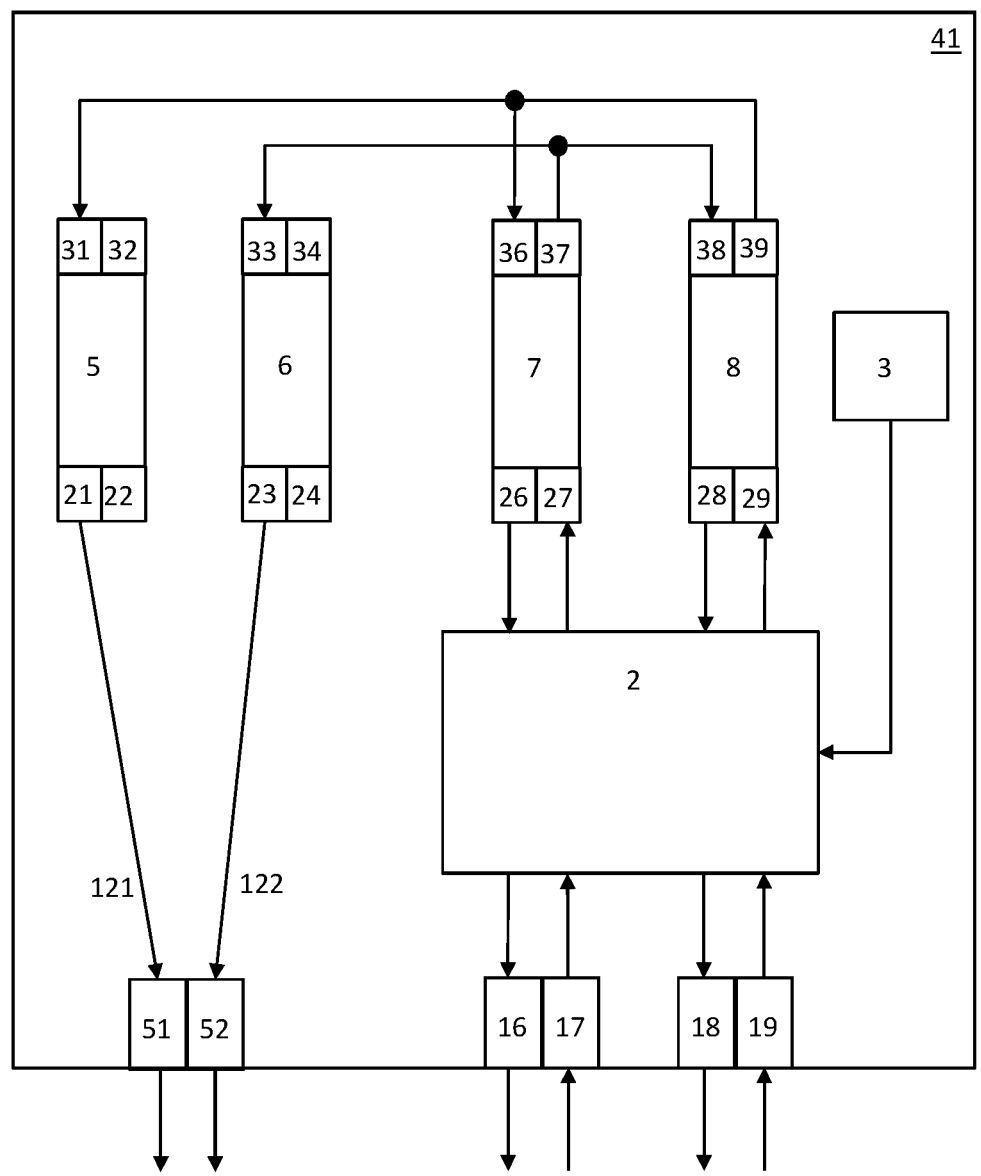
FIG. 2 is a block diagram of a second embodiment of the network tap.

The fifth connector 11 and the sixth connector 13 are output connectors for providing monitoring signals to the monitoring device. The seventh connector 12 and the eight connector 14 are input connectors, which are not used, because the monitoring device does not provide input signals. FIG. 2 shows a second embodiment of the network tap. In the embodiment of FIG. 2, the network tap 41 comprises only output connectors 51 and 52 for connecting a monitoring device and input connectors for connecting a monitoring device have been omitted.

Figure 3:
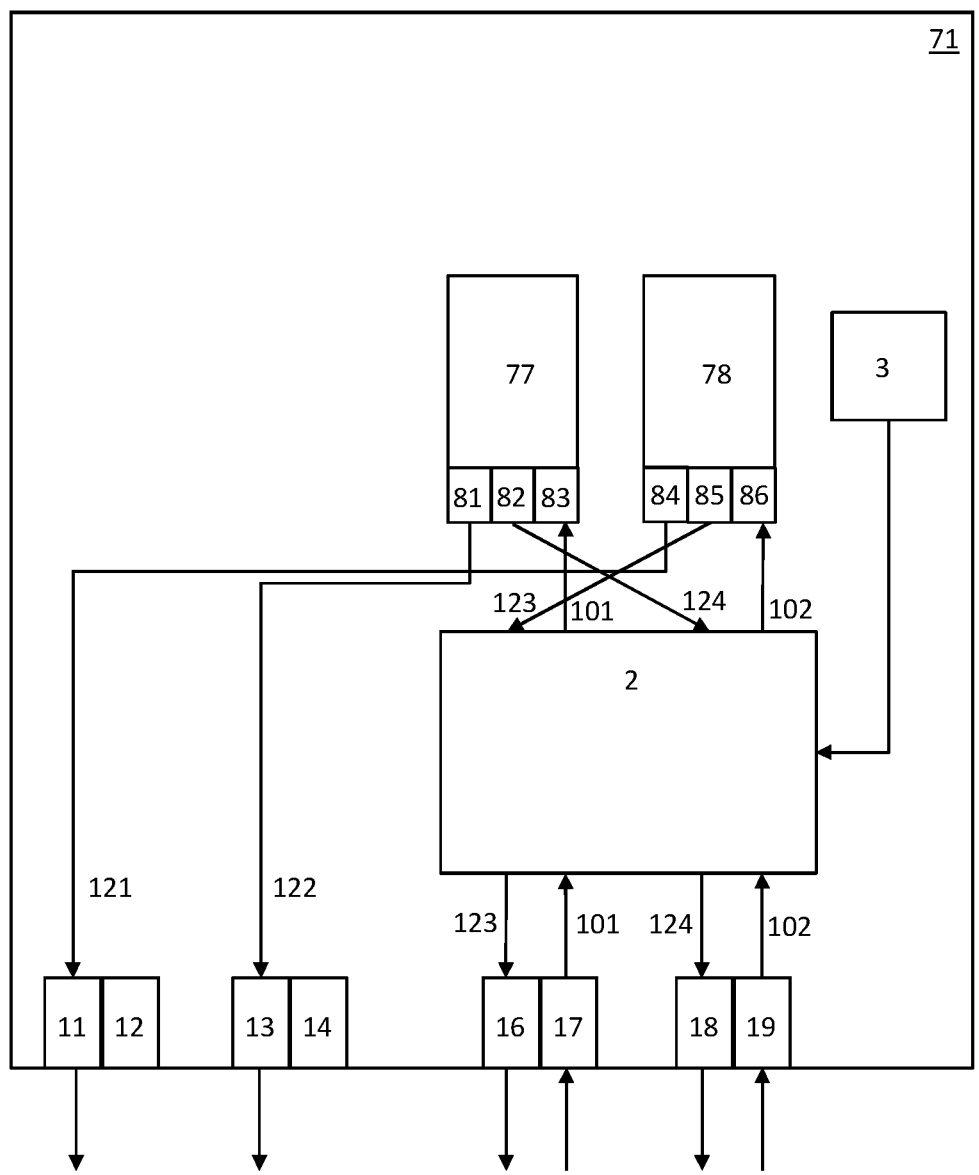
FIG. 3 is a block diagram of a third embodiment of the network tap.

FIG. 3 shows a third embodiment of the network tap. In the network tap 71, the optical signal regeneration circuits 5-8 have been replaced with a first optical signal regeneration circuit 77 and a second optical signal regeneration circuit 78.

The first optical signal regeneration circuit 77 has optical output ports 81 and 82 for transmitting optical signals and an optical input port 83 for receiving an optical signal. The second optical signal regeneration circuit 78 has optical output ports 84 and 85 for transmitting optical signals and an optical input port 86 for receiving an optical signal.

The first optical signal regeneration circuit 77 is configured to receive the first optical input signal 101 from the failover circuit 2, convert the first optical input signal 101 to a first set of one or more electromagnetic signals, generate a first optical output signal 124 and a second optical output signal 122 from the first set of one or more electromagnetic signals and provide the first optical output signal 124 to the third connector 18 via the failover circuit 2 and the second optical output signal 122 to the sixth connector 13.

The second optical signal regeneration circuit 78 is configured to receive the second optical input signal 102 from the failover circuit 2, convert the second optical input signal 102 to a second set of one or more electromagnetic signals, generate a third optical output signal 123 and a fourth optical output signal 121 from the second set of one or more electromagnetic signals and provide the third optical output signal 123 to the first connector 16 via the failover circuit 2 and the fourth optical output signal 121 to the fifth connector 11.

Thus, the regeneration can not only be done with the optical modules described in relation to FIG. 1, but also with discrete components or optical modules with buffers for signal splitting and the monitoring outputs can be regenerated multiple times, using the same regeneration and splitting technique, or by adding a fanout/buffer circuit.

Figure 4:
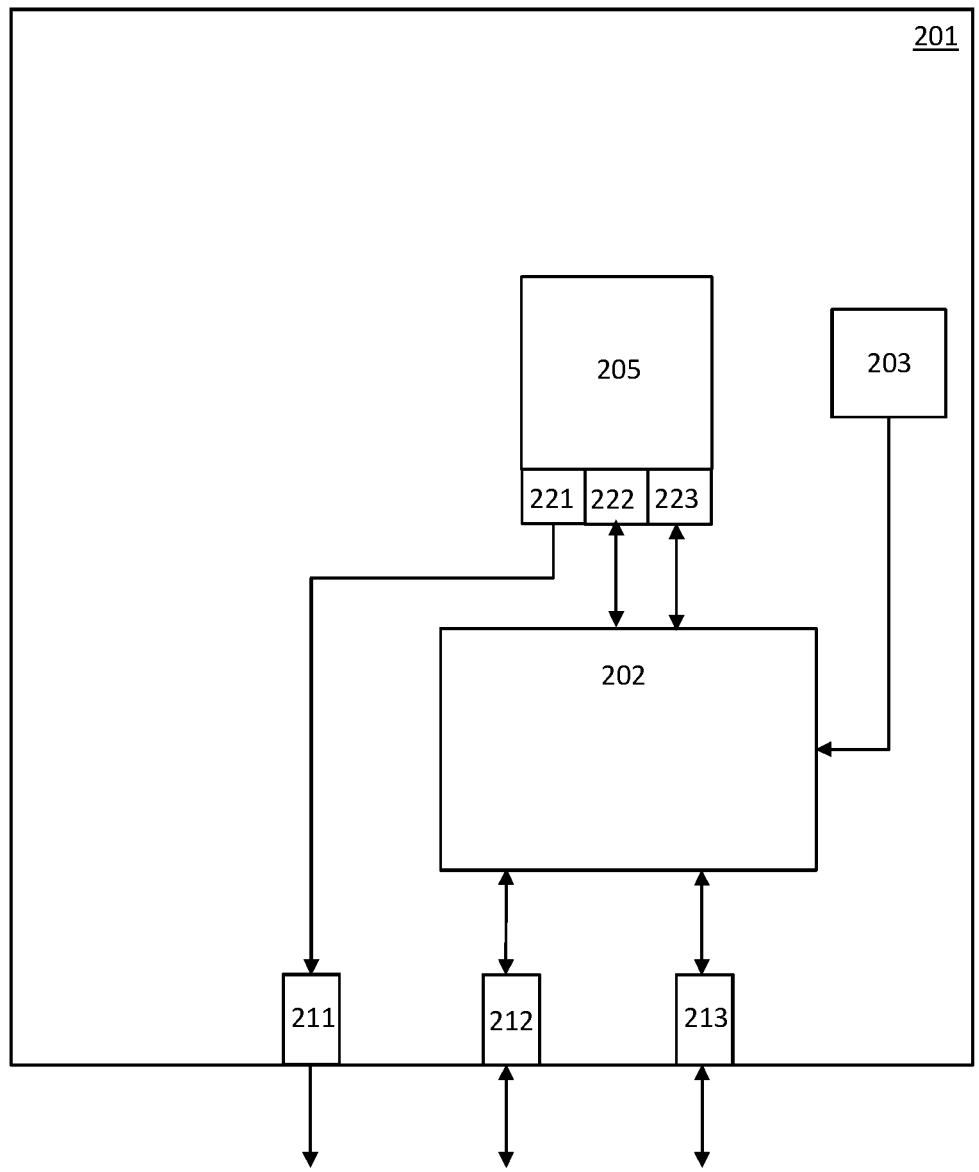
FIG. 4 is a block diagram of a fourth embodiment of the network tap.

FIG. 4 shows a fourth embodiment of the network tap. In the network tap 201, the first set of one or more connectors comprises a first bidirectional connector 212 and the second set of one or more connectors comprises a second bidirectional connector 213. The bidirectional connectors 212 and 213 may be used to receive and transmit BiDi optical signals, i.e. optical signals in which input and output signals have been multiplexed using Wavelength-Division Multiplexing (WDM).

The network tap 201 comprises a first connector 212 for connecting to a first network device, a second connector 213 for connecting to a second network device, a third connector 211 for connecting to a monitoring device, an optical signal regeneration circuit 205 and a failover circuit 202. The optical signal regeneration circuit 205 has bidirectional optical ports 222 and 223 and a unidirectional or bidirectional optical port 221.

The failover circuit 202 is configured to receive a first optical input signal from the first connector 212 and provide the first optical input signal to the optical signal regeneration circuit 205 in a normal mode and to the second connector 213 in a failure mode and further configured to receive a second optical input signal from the second connector 213 and provide the second optical input signal to the optical signal regeneration circuit 205 in the normal mode and to the first connector 212 in the failure mode.

The optical signal regeneration circuits 205 is configured to receive the first optical input signal from the failover circuit 202, convert the first optical input signal to a first set of one or more electromagnetic signals, generate a first optical output signal and a second optical output signal from the first set of one or more electromagnetic signals and provide the first optical output signal to the second connector 213 and the second optical output signal to the third connector 211.

The optical signal regeneration circuits 205 is further configured to receive the second optical input signal from the failover circuit 202, convert the second optical input signal to a second set of one or more electromagnetic signals, generate a third optical output signal and a fourth optical output signal from the second set of one or more electromagnetic signals and provide the third optical output signal to the first connector 212 and the fourth optical output signal to the third connector 211.

In the embodiment of FIG. 4, the second and fourth optical signals are combined into one optical signal and provided to a single connector, i.e. third connector 211. In this embodiment, the optical signal regeneration circuit 205 has multiple transmitters, one per wavelength, and outputs multiple signals on one or more fibers using WDM.

Figure 5:
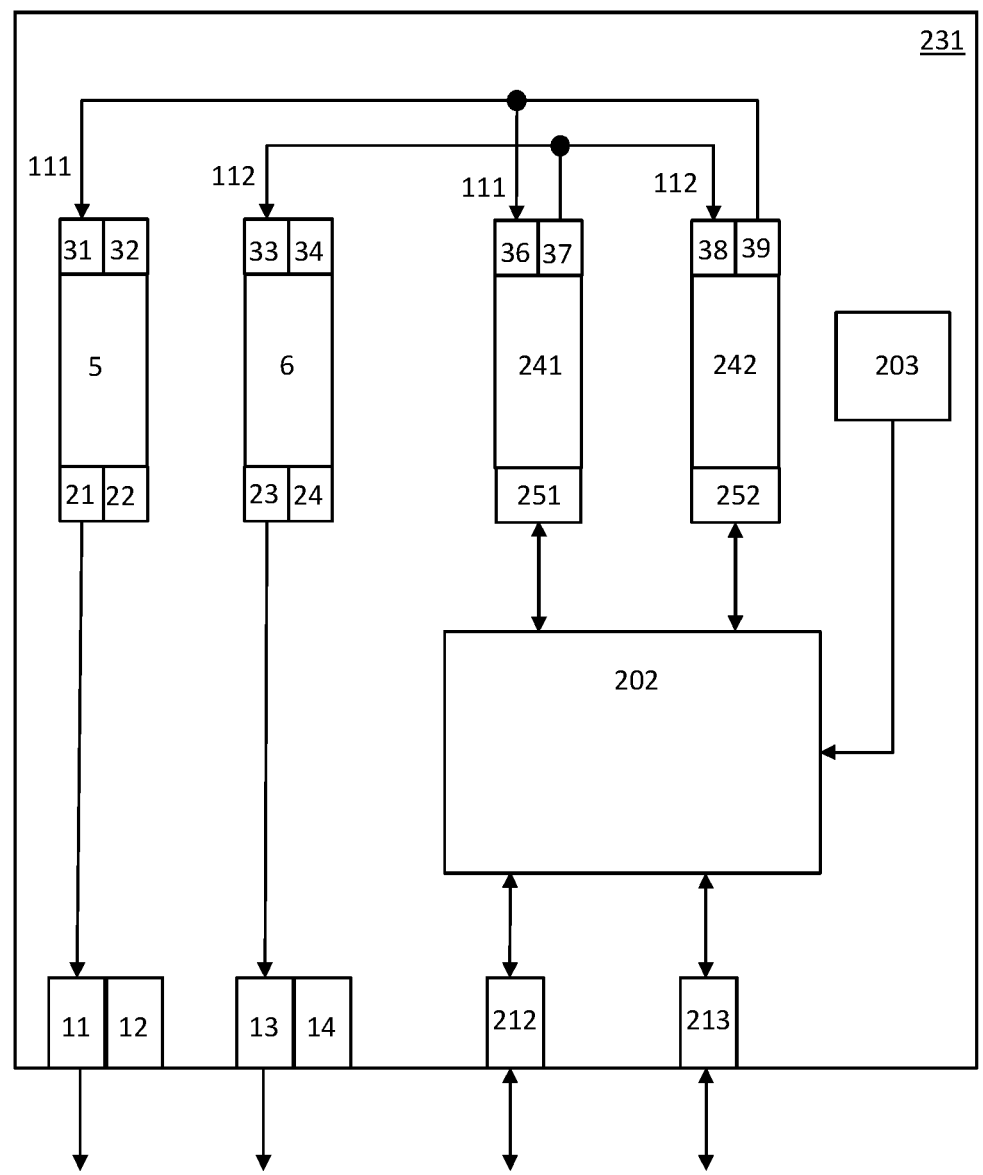
FIG. 5 is a block diagram of a fifth embodiment of the network tap.

FIG. 5 shows a fifth embodiment of the network tap. In the network tap 231, the first set of one or more connectors also comprises a first bidirectional connector 212 and the second set of one or more connectors also comprises a second bidirectional connector 213, like in the embodiment of FIG. 4. However, in the embodiment of FIG. 5, the second and fourth optical signals are not combined into one optical signal and two connectors are provided for connecting to the monitoring device, like in the embodiment of FIG. 1. This is a more straightforward implementation than the embodiment of FIG. 4.

In the embodiment of FIG. 5, four optical signal regeneration circuits are used, like in the embodiment of FIG. 1. In the embodiment of FIG. 5, the non-BiDi modules of FIG. 1 are used for optical signal regeneration circuits 5 and 6. In an alternative embodiment, BiDi modules of the same wavelength type are used for optical signal regeneration circuits 5 and 6.

The third and fourth optical signal regeneration circuits 7 and 8 of FIG. 1 have been replaced with third and fourth optical signal regeneration circuits 241 and 242, respectively. Optical signal regeneration circuits 241 and 242 are BiDi modules, These BiDi modules have one bidirectional fiber, but still use separated RX and TX on the electrical interface.

The third optical signal regeneration circuit 241 has a bidirectional optical port 251 for receiving and transmitting optical signals, an electromagnetic input port 36 for receiving an electromagnetic signal and an electromagnetic output port 37 for transmitting an electromagnetic signal. The fourth optical signal regeneration circuit 242 has a bidirectional optical port 252 for receiving and transmitting optical signals, an electromagnetic input port 38 for receiving an electromagnetic signal and an electromagnetic output port 39 for transmitting an electromagnetic signal.

In the embodiments of FIGS. 1-5, the optical signal regeneration circuits, connectors and connections (circuitry and/or cabling) may be chosen based on the desired network speed and technology, such as 40GBASE-SR4, 40GBASE-LR4 or 100GBASE-SR4. The latter list is non-limiting and other technologies, which are not all mentioned in this description, may be us. Although only one line is drawn between each pair of components, multiple lanes (fibers or electrical lanes) may be used to interconnect a pair of components.

As a first example, the electromagnetic signals 111 and 112 of FIG. 1 may be transported over multiple lanes, e.g. 4×10 Gbps if a QSFP 40G module is used as optical signal regeneration circuit and 4×25 Gbps if a QSFP28 100G module is used as optical signal regeneration circuit. As a second example, if 40G BiDi modules are used as optical signal regeneration circuits 241 and 242 in the embodiment of FIG. 6, then the electromagnetic signals 111 and 112 would typically be transported over 4 lanes, each supporting 10 Gbps, and typically two bidirectional fibers would be used, one wavelength per fiber in each direction with 20 Gbps per wavelength, so 40 Gbps in each direction.

Similarly, optical signals may be transported over multiple lanes as well, e.g. 40GBASE-SR4 has 8 fibers (4 fibers per duplex) and 8 electrical lanes (4 lanes per duplex). 100GBASE-LR10 has 2 fibers, one duplex per fiber, and supports 10 wavelengths in each fiber. A 100GBASE-LR10 CFP (C Form-factor Pluggable) module has 10 electrical lanes.

Figure 6:
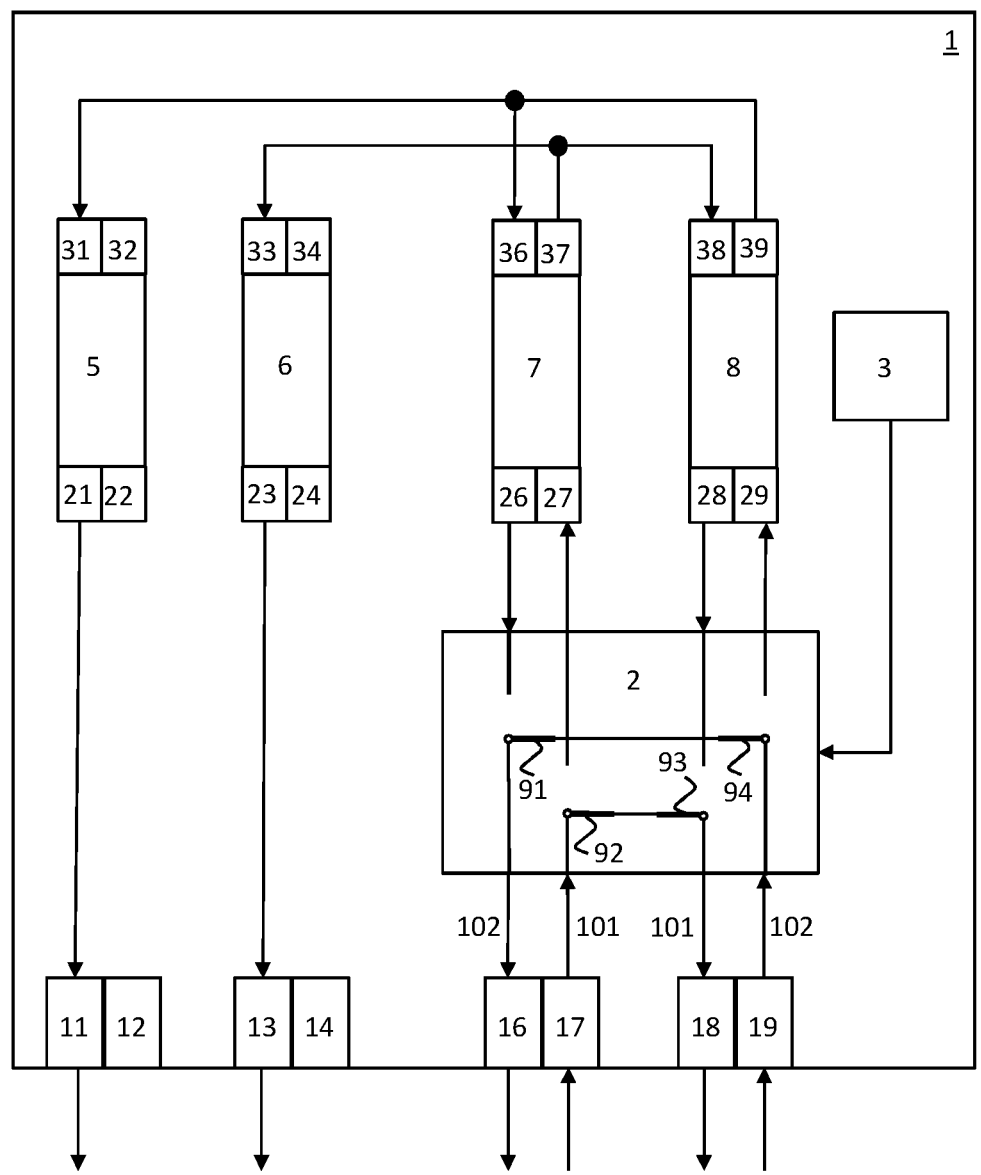
FIG. 6 illustrates the operation of the failover circuit in a failure mode in the network tap of FIG. 1.
Figure 7:
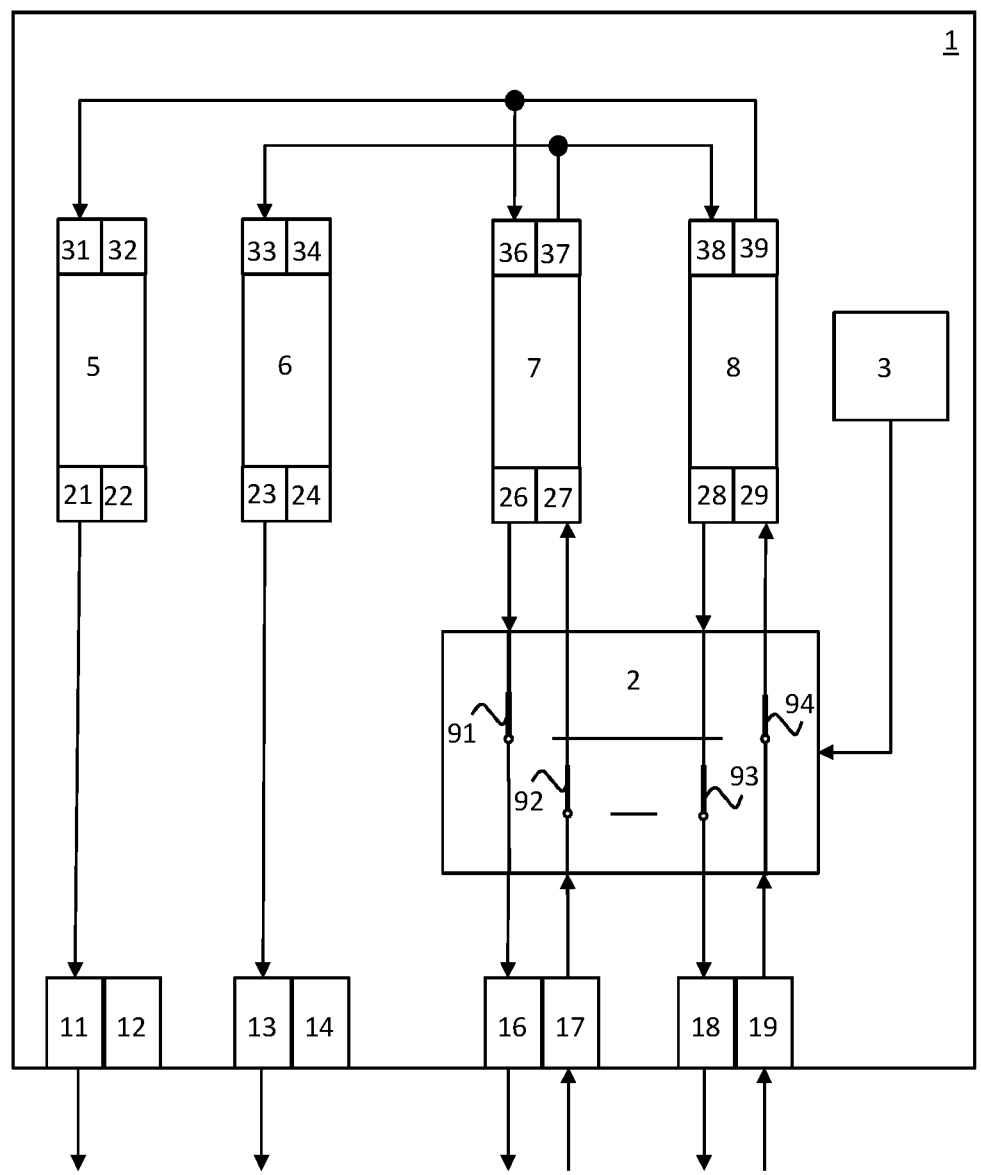
FIG. 7 illustrates the operation of the failover circuit in a normal mode in the network tap of FIG. 1.

FIGS. 6 and 7 illustrates the operation of the failover circuit in the network tap 1 of FIG. 1. FIG. 6 illustrates the operation of the failover circuit in a failure mode and FIG. 7 illustrates the operation of the failover circuit in a normal mode.

FIGS. 6 and 7 show four switches 91-94 controlled by the controller 3. In the failure mode/unpowered mode, see FIG. 6, the switches 91-94 are controlled to connect first connector 16 with the fourth connector 19 and the second connector 17 with the third connector 18. In the normal mode/powered mode, see FIG. 7, the switches 91-94 are controlled to connect the connectors 16-19 to the optical connectors 26-29 of the optical signal regeneration circuits 7 and 8, respectively. The failover circuit 202 of FIGS. 4 and 5 is a bit simpler than the failover circuit 2 of FIG. 1, because it is connected to the two network devices and the two optical signal regeneration circuits via only four connectors.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A network tap, comprising:
   a first set of one or more connectors configured to connect to a first network device;
   a second set of one or more connectors configured to connect to a second network device;
   a third set of one or more connectors configured to connect to a monitoring device;
   a set of one or more optical signal regeneration circuits; and
   a failover circuit configured to receive a first optical input signal from said first set of one or more connectors and provide said first optical input signal to said set of one or more optical signal regeneration circuits in a normal mode and to said second set of one or more connectors in a failure mode and further configured to receive a second optical input signal from said second set of one or more connectors and provide said second optical input signal to said set of one or more optical signal regeneration circuits in said normal mode and to said first set of one or more connectors in said failure mode,
   wherein said set of one or more optical signal regeneration circuits is configured to receive said first optical input signal from said failover circuit, convert said first optical input signal to a first set of one or more electromagnetic signals, generate a first optical output signal and a second optical output signal from said first set of one or more electromagnetic signals and provide said first optical output signal to said second set of one or more connectors and said second optical output signal to said third set of one or more connectors, and
   said set of one or more optical signal regeneration circuits is further configured to receive said second optical input signal from said failover circuit, convert said second optical input signal to a second set of one or more electromagnetic signals, generate a third optical output signal and a fourth optical output signal from said second set of one or more electromagnetic signals and provide said third optical output signal to said first set of one or more connectors and said fourth optical output signal to said third set of one or more connectors.

2. The network tap as claimed in claim 1, further comprising a controller configured to detect whether power is being supplied to said network tap and control said failover circuit to activate said failure mode upon detecting that power is no longer being supplied to said network tap.

3. The network tap as claimed in claim 1, wherein said first set of one or more connectors comprises a first connector and a second connector, said second set of one or more connectors comprises a third connector and a fourth connector and said third set of one or more connectors comprises a fifth connector and a sixth connector.

4. The network tap as claimed in claim 3, further comprising a controller configured to detect whether power is being supplied to said network tap and control said failover circuit to activate said failure mode upon detecting that power is no longer being supplied to said network tap.

5. The network tap as claimed in claim 3, wherein:
said failover circuit is configured to receive said first optical input signal from said second connector and provide said first optical input signal to said set of one or more optical signal regeneration circuits in said normal mode and to said third connector in said failure mode and further configured to receive said second optical input signal from said fourth connector and provide said second optical input signal to said set of one or more optical signal regeneration circuits in said normal mode and to said first connector in said failure mode, and
said set of one or more optical signal regeneration circuits is configured to provide said first optical output signal to said third connector and said second optical output signal to said sixth connector and provide said third optical output signal to said first connector and said fourth optical output signal to said fifth connector.

6. The network tap as claimed in claim 5, further comprising a controller configured to detect whether power is being supplied to said network tap and control said failover circuit to activate said failure mode upon detecting that power is no longer being supplied to said network tap.

7. The network tap as claimed in claim 5, wherein:
said set of one or more optical signal regeneration circuits comprises a first optical signal regeneration circuit, a second optical signal regeneration circuit, a third optical signal regeneration circuit, and a fourth optical signal regeneration circuit,
said third optical signal regeneration circuit being configured to receive said first optical input signal from said failover circuit and convert said first optical input signal to a first electromagnetic signal, said first electromagnetic signal being provided to said second optical signal regeneration circuit and said fourth optical signal regeneration circuit,
said fourth optical signal regeneration circuit being configured to receive said second optical input signal from said failover circuit and convert said second optical input signal to a second electromagnetic signal, said second electromagnetic signal being provided to said first optical signal regeneration circuit and said third optical signal regeneration circuit,
said first optical signal regeneration circuit being configured to receive said second electromagnetic signal from said fourth optical signal regeneration circuit, generate said fourth optical output signal from said second electromagnetic signal, and provide said fourth optical output signal to said fifth connector,
said second optical signal regeneration circuit being configured to receive said first electromagnetic signal from said third optical signal regeneration circuit, generate said second optical output signal from said first electromagnetic signal, and provide said second optical output signal to said sixth connector,
said third optical signal regeneration circuit further being configured to receive said second electromagnetic signal from said fourth optical signal regeneration circuit, generate said third optical output signal from said second electromagnetic signal, and provide said third optical output signal to said first connector via said failover circuit, and
said fourth optical signal regeneration circuit further being configured to receive said first electromagnetic signal from said third optical signal regeneration circuit, generate said first optical output signal from said first electromagnetic signal, and provide said first optical output signal to said to said third connector via said failover circuit.

8. The network tap as claimed in claim 7, further comprising a controller configured to detect whether power is being supplied to said network tap and control said failover circuit to activate said failure mode upon detecting that power is no longer being supplied to said network tap.

9. The network tap as claimed in claim 5, wherein said set of one or more optical signal regeneration circuits comprises a first optical signal regeneration circuit and a second optical signal regeneration circuit,
said first optical signal regeneration circuit being configured to receive said first optical input signal from said failover circuit, convert said first optical input signal to said first set of one or more electromagnetic signals, generate said first optical output signal and said second optical output signal from said first set of one or more electromagnetic signals and provide said first optical output signal to said third connector via said failover circuit and said second optical output signal to said sixth connector, and
said second optical signal regeneration circuit being configured to receive said second optical input signal from said failover circuit, convert said second optical input signal to said second set of one or more electromagnetic signals, generate said third optical output signal and said fourth optical output signal from said second set of one or more electromagnetic signals and provide said third optical output signal to said first connector via said failover circuit and said fourth optical output signal to said fifth connector.

10. The network tap as claimed in claim 9, further comprising a controller configured to detect whether power is being supplied to said network tap and control said failover circuit to activate said failure mode upon detecting that power is no longer being supplied to said network tap.

11. The network tap as claimed in claim 5, wherein said third set of one or more connectors comprises a first pair of connectors and a second pair of connectors, said first pair of connectors comprising said fifth connector and a seventh connector and said second pair of connectors comprising said sixth connector and an eighth connector.

12. The network tap as claimed in claim 11, further comprising a controller configured to detect whether power is being supplied to said network tap and control said failover circuit to activate said failure mode upon detecting that power is no longer being supplied to said network tap.

13. The network tap as claimed in claim 7, wherein said third set of one or more connectors comprises a first pair of connectors and a second pair of connectors, said first pair of connectors comprising said fifth connector and a seventh connector and said second pair of connectors comprising said sixth connector and an eighth connector.

14. The network tap as claimed in claim 13, further comprising a controller configured to detect whether power is being supplied to said network tap and control said failover circuit to activate said failure mode upon detecting that power is no longer being supplied to said network tap.

15. The network tap as claimed in claim 9, wherein said third set of one or more connectors comprises a first pair of connectors and a second pair of connectors, said first pair of connectors comprising said fifth connector and a seventh connector and said second pair of connectors comprising said sixth connector and an eighth connector.

16. The network tap as claimed in claim 15, further comprising a controller configured to detect whether power is being supplied to said network tap and control said failover circuit to activate said failure mode upon detecting that power is no longer being supplied to said network tap.

17. The network tap as claimed in claim 1, wherein said first set of one or more connectors comprises a first bidirectional connector and said second set of one or more connectors comprises a second bidirectional connector.

18. The network tap as claimed in claim 17, further comprising a controller configured to detect whether power is being supplied to said network tap and control said failover circuit to activate said failure mode upon detecting that power is no longer being supplied to said network tap.

* * * * *